(12) United States Patent
Guldenschuh

(10) Patent No.: US 11,168,787 B2
(45) Date of Patent: Nov. 9, 2021

(54) HYDRAULIC SYSTEM AND MOTOR VEHICLE TRANSMISSION

(71) Applicant: ZF Friedrichshafen AG, Friedrichshafen (DE)

(72) Inventor: Dominik Guldenschuh, Friedrichshafen (DE)

(73) Assignee: ZF Friedrichshafen AG, Friedrichshafen (DE)

(*) Notice: Subject to any disclaimer, the term of this patent is extended or adjusted under 35 U.S.C. 154(b) by 0 days.

(21) Appl. No.: 16/545,858

(22) Filed: Aug. 20, 2019

(65) Prior Publication Data

US 2020/0056697 A1 Feb. 20, 2020

(30) Foreign Application Priority Data

Aug. 20, 2018 (DE) .......................... 102018214006.5

(51) Int. Cl.
| | |
|---|---|
| *F16H 61/18* | (2006.01) |
| *F16H 61/30* | (2006.01) |
| *F16H 61/02* | (2006.01) |
| *F15B 15/04* | (2006.01) |
| *F16H 61/00* | (2006.01) |
| *F16H 63/30* | (2006.01) |

(52) U.S. Cl.
CPC ......... *F16H 61/0276* (2013.01); *F15B 15/04* (2013.01); *F16H 2061/0046* (2013.01); *F16H 2063/3093* (2013.01)

(58) Field of Classification Search
CPC ....... F16H 61/18; F16H 61/30; F16H 61/3023
USPC .................................................. 137/625.69
See application file for complete search history.

(56) References Cited

U.S. PATENT DOCUMENTS

| | | | | |
|---|---|---|---|---|
| 2,527,727 | A * | 10/1950 | Hobbs ..................... | F16H 61/30 74/346 |
| 5,507,197 | A * | 4/1996 | Devaud ............... | F16H 61/2807 477/138 |
| 6,182,697 | B1 * | 2/2001 | Parker ..................... | F15B 13/01 137/625.16 |

(Continued)

FOREIGN PATENT DOCUMENTS

| | | |
|---|---|---|
| DE | 10 2006 035 938 A1 | 2/2008 |
| DE | 10 2007 048 697 A1 | 4/2009 |

(Continued)

OTHER PUBLICATIONS

Original and Translation of DE 102013108595 A1; Langen, Alfred; Feb. 12, 2015.*

(Continued)

*Primary Examiner* — Paul J Gray
(74) *Attorney, Agent, or Firm* — Crowell & Moring LLP

(57) ABSTRACT

A hydraulic system is described, in particular for a motor vehicle transmission, with an actuator, a valve, a pressure supply line and a tank line. The actuator may have a first pressure chamber and a second pressure chamber, which can have pressure applied for actuation of the actuator, wherein the pressure chambers, the pressure supply line and the tank line are each connected to a port (A, B, P, T) of the valve. The valve may have several different switching positions, in which the pressure chambers with the pressure supply line or the tank line are selectively connected to each other or shut off from each other.

18 Claims, 4 Drawing Sheets

(56) References Cited

U.S. PATENT DOCUMENTS

2011/0202232 A1* 8/2011 Busch .................... A01B 63/00
                                                              701/36

FOREIGN PATENT DOCUMENTS

| DE | 10 2011 005 680 A1 | 10/2012 |
| WO | WO 2012/123181 A1 | 9/2012 |
| WO | WO 2018/025071 A1 | 2/2018 |

OTHER PUBLICATIONS

Office Action dated May 3, 2019 for German Patent Application No. 10 2018 214 006.5, (12 pp.), note: pp. 1 and 2 are English language Explanations to Section C. Result of Determination Document.

* cited by examiner

HYDRAULIC SYSTEM AND MOTOR VEHICLE TRANSMISSION

RELATED APPLICATIONS

This application claims the benefit and priority of German Patent Application DE 10 2018 214 006.5, filed Aug. 20, 2018, which is incorporated by reference herein in its entirety.

TECHNICAL FIELD

The present disclosure relates to a hydraulic system, in particular a hydraulic system for motor vehicle transmissions, as well as a motor vehicle transmission.

BACKGROUND

Hydraulic systems are used in known motor vehicle transmissions among other things to control clutch devices. For example, in the case of dog clutches an axial movement of the claw can be realized via a hydraulically actuated piston, which is connected to a switching rod of the dog clutch.

A fixing of the claw in a neutral position (claw disengaged) is in so doing frequently realized by a mechanical part or by a hydraulic blocking of the piston. However, an additional part is necessary for the mechanical fixing, which requires additional installation space and hence causes additional costs. In the case of a hydraulic fixing of the piston in the neutral position, leaks in the valve can result in the piston inadvertently switching and as a result for example an unwanted gear is engaged.

Therefore, certain embodiments of the present disclosure address the problem of providing a hydraulic system and a motor vehicle transmission in which the disadvantages from the prior art are remedied.

DETAILED DESCRIPTION

Figure 1:
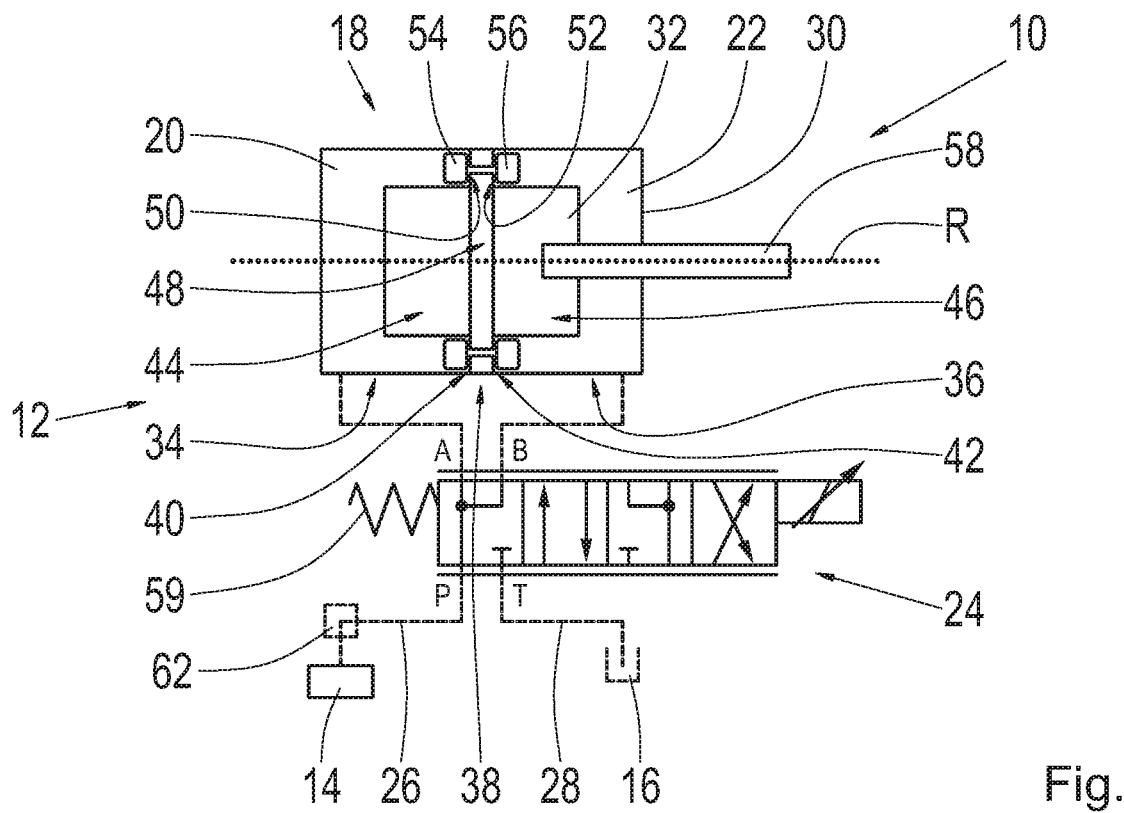
FIG. 1 schematically shows a section from a motor vehicle with a hydraulic system.

This disclosure relates to a hydraulic system for solving a problem. For example, an example of a hydraulic system described in the following paragraphs may be for a motor vehicle transmission, and may have an actuator, a valve, a pressure supply line and a tank line. In this example, the actuator has a first pressure chamber and a second pressure chamber, which can have pressure applied for actuation of the actuator, wherein the pressure chamber, the pressure supply line and the tank line are each connected to a port of the valve. The valve has several different switching positions in which the pressure chambers with the pressure supply line or the tank line are selectively connected to each other or shut off from each other, wherein at least in an initial position of the valve there is a fluid connection between the pressure chambers.

Via the fluid connection, a pressure compensation can occur between the two pressure chambers in defined manner. As a result, leaks, in particular valve leaks, can be compensated, which would otherwise lead to a pressure decrease in the two pressure chambers. Thus, in spite of potential existing leaks in both pressure chambers, at least in the initial position of the valve, the same pressure always ensures so that the actuator will not be inadvertently actuated.

According to one embodiment, provision is made that the valve is transmitted back to the initial position by a return device. In particular, the return device is a spring. Thus the valve is then designed as a spring-loaded valve. If the valve is unactuated, thus, is not being exposed to an external force, due to the return device it returns to the initial position, in which, as described above, an equilibrium pressure always ensues in the two pressure chambers. In other words, without external force the unactuated valve always returns to the switch position in which the actuator cannot be inadvertently actuated.

The valve can be an electromagnetically actuated or a pilot-controlled valve. Accordingly, the valve is controlled by means of an electromagnet or by means of a hydraulic or pneumatic pressure.

In a further embodiment, the actuator has a cylinder and an actuator piston held in the cylinder, wherein the actuator piston divides the cylinder into the first pressure chamber and the second pressure chamber, in particular wherein a switch element of the actuator is connected to the actuator piston. In particular, the switch element is a switching rod of the motor vehicle transmission, for example a switching rod of a clutch device, for example such as a dog clutch.

Preferably the actuator piston is in a neutral position when the valve is in the initial position. In particular, a clutch device of the motor vehicle transmission connected to the actuator piston via the switch element is open in the neutral position of the piston. In the case of a dog clutch, this means that the claw is disengaged.

A further aspect provides that the actuator has at least one annular piston, which is arranged around at least part of the actuator piston and which seals the first pressure chamber from the second chamber. The annular piston effectively prevents an unwanted leakage between the two pressure chambers and thus prevents an unwanted pressure compensation. In particular, the annular piston is movable toward the actuator piston and therefore can also be referred to as a floating piston.

Preferably, a stop is provided in the cylinder, on which the annular piston abuts in a first a first switching position of the valve. In particular, the first switching position of the valve is the initial position of the valve. The annular piston abuts on the stop at least whenever a pressure equilibrium ensues between the two pressure chambers. In other words, in the neutral position of the actuator piston the annular piston lies on the stop. By means of the stop a movement of the annular piston in the cylinder is easily limited to a predefined area. In particular, the annular piston is defined by the stop to the first or the second pressure chamber. In addition, the stop and the adjacent annular piston can provide a seal.

According to one embodiment, the cylinder has at least a first section and a second section, wherein the first section forms the first pressure chamber and the second section forms the second pressure chamber, and wherein the actuator piston has at least a first section and a second section, wherein the first section of the actuator piston is assigned to the first pressure chamber and the second section of the actuator piston is assigned to the second pressure chamber. In the neutral position of the actuator piston the first and the second section of the actuator piston are in the first pressure chamber or in the second pressure chamber. If one of the two pressure chambers has a higher pressure applied, the actuator piston moves in the direction of the lower pressure, causing the actuator to be actuated.

According to a further embodiment, provision is made that the inner cross-sectional area of the first section of the cylinder is greater than the inner cross-sectional area of the second section of the cylinder, so that a step forms, and/or wherein the cross-sectional area of the first section of the actuator piston is less than the cross-sectional area of the second section of the actuator piston, so that a further step forms.

For example, the first section of the cylinder limits the first pressure chamber and the second section of the cylinder limits the second pressure chamber. In particular, then the second section of the actuator piston on the outside is configured essentially complementary to an inside wall of the second section of the cylinder. Further, an annular piston can be provided on the first section, which on the outside is configured essentially complementary to an inside wall of the first section of the cylinder and on the inside is configured essentially complementary to an outside wall of the first section of the actuator piston.

In the process, by "essentially complementary" it is understood, and to be understood in the following, that an intermediate space between the components is configured such that fluid cannot even pass through or can pass through only with a small volume flow.

In particular, by means of the step and/or the further step a stop is configured, on which the annular piston lies at least in the initial position of the valve. Preferably, in every switching position of the valve the annular piston abuts at least on the step or the further step. As a result, the pressure chambers are effectively sealed against one another.

A further aspect provides that the cylinder has a third section, which lies between the first section and the second section of the cylinder and whose inner cross-sectional area is less than the inner cross-sectional area of the first section and/or of the second section of the cylinder. The inner cross-sectional areas of the first and of the second section can be alike or different from each other, preferably alike. Since the third section of the cylinder has a smaller inner cross-section than the other two sections of the cylinder, in each case a step is formed between the first section and the third section as well as between the third section and the second section. In particular, in each case these steps form a stop.

The actuator piston can have a third section, which lies between the first section and the second section of the actuator piston and whose cross-sectional area is greater than the cross-sectional area of the first section and/or of the second section of the actuator piston. In particular, the third section of the actuator piston is assigned to the third section of the cylinder and is located in a neutral position of the actuator piston in it. Preferably the third section of the actuator piston is configured essentially complementary to an inside wall of the third section of the cylinder.

In one embodiment, two annular pistons are provided, wherein the first annular piston is arranged around the first section of the actuator piston and the second annular piston is arranged around the second section of the actuator piston.

By means of the two annular pistons the first and the second pressure chamber are separated from each other in a fluid-tight manner.

Preferably the first annular piston on the outside is configured essentially complementary to the inside wall of the first section of the cylinder and/or the second annular piston on the outside is configured essentially complementary to an inside wall of the third section of the cylinder. As a result of this, the sealing effect of the annular piston is further increased.

Further preferably, the first annular piston on the inside is configured essentially complementary to an outside wall of the first section of the actuator piston and/or the second annular piston on the inside is configured essentially complementary to an outside wall of the third section of the actuator piston. As a result, the sealing effect is also increased.

In particular, the pressure chambers in the first switching position of the valve are connected neither to the pressure supply line nor to the tank line, wherein the pressure chambers are fluidically connected to each other by means of a bypass line. The bypass line allows a pressure compensation between the two pressure chambers at a predefined speed, which can be specified by selecting a cross-section of the bypass line. Thus, if there is a pressure loss in one of the pressure chambers, for example through leaks in the valve, due to the bypass line in both pressure chambers the same pressure ensues again.

Preferably the bypass line is provided within the actuator, in particular wherein the bypass line is configured as a borehole through the actuator piston. As a result, no further connections or lines are required on the cylinder provided to the bypass line.

According to a further aspect, the pressure chambers are each connected to the pressure supply line in the initial position of the valve. The fluid connection between the two pressure chambers in this variant is established within the valve by means of a common connection of the two pressure chambers to the pressure supply line. Accordingly, the same pressure always prevails in both pressure chambers, said pressure being provided by a pressure source via the pressure supply line. As a result, leaks are likewise compensated, in particular leaks in the valve, so that the actuator cannot be inadvertently actuated.

Preferably the valve is a 4/4 way valve or a 5/4 way valve. Accordingly, the valve has four possible switching positions, wherein a first switching position is the initial position. In the case of a 5/4 way valve the additional port is then preferably assigned to the tank line.

One possible embodiment provides that in a second switching position of the valve the first pressure chamber is connected to the pressure supply line and the second pressure chamber is connected to the tank line; in a third switching position of the valve the pressure chambers are each connected to the tank line; and/or in a fourth switching position of the valve the first pressure line is connected to the tank line and the second pressure line is connected to the pressure supply line.

Upon actuation of the actuator these switching positions are preferably passed through in ascending order. Thus, the valve is at first in the initial position, then in the second switching position, then in the third switching position and finally in the fourth switching position.

A blocking device can be provided which permits switching back from the fourth switching position to the initial switching position without changing the pressure in the pressure chambers. Preferably the blocking device is configured as a switchable shut-off valve which, for example, is arranged in the pressure supply line. Accordingly, in a blocking position of the shut-off valve independent from the switching position of the valve, pressure is prevented from being applied to one of the two pressure chambers via the pressure supply line. Accordingly, it is possible to change from the fourth switching position of the valve to the initial position, without acting on the actuator piston again in the second switching position of the actuator piston in the direction of the second pressure chamber.

The problem is further solved in accordance with the invention by a motor vehicle transmission with an above described hydraulic system, a pressure source and a tank, wherein the pressure supply line is fluidically connected to the pressure source and the tank line is fluidically connected to the tank and/or wherein the motor vehicle transmission has a switching rod, which is connected to the actuator piston for power transmission. Reference is made to the above explanations with respect to the advantages.

Further advantages and properties arise from the subsequent description and the attached drawings, to which reference is made.

Figure 2:
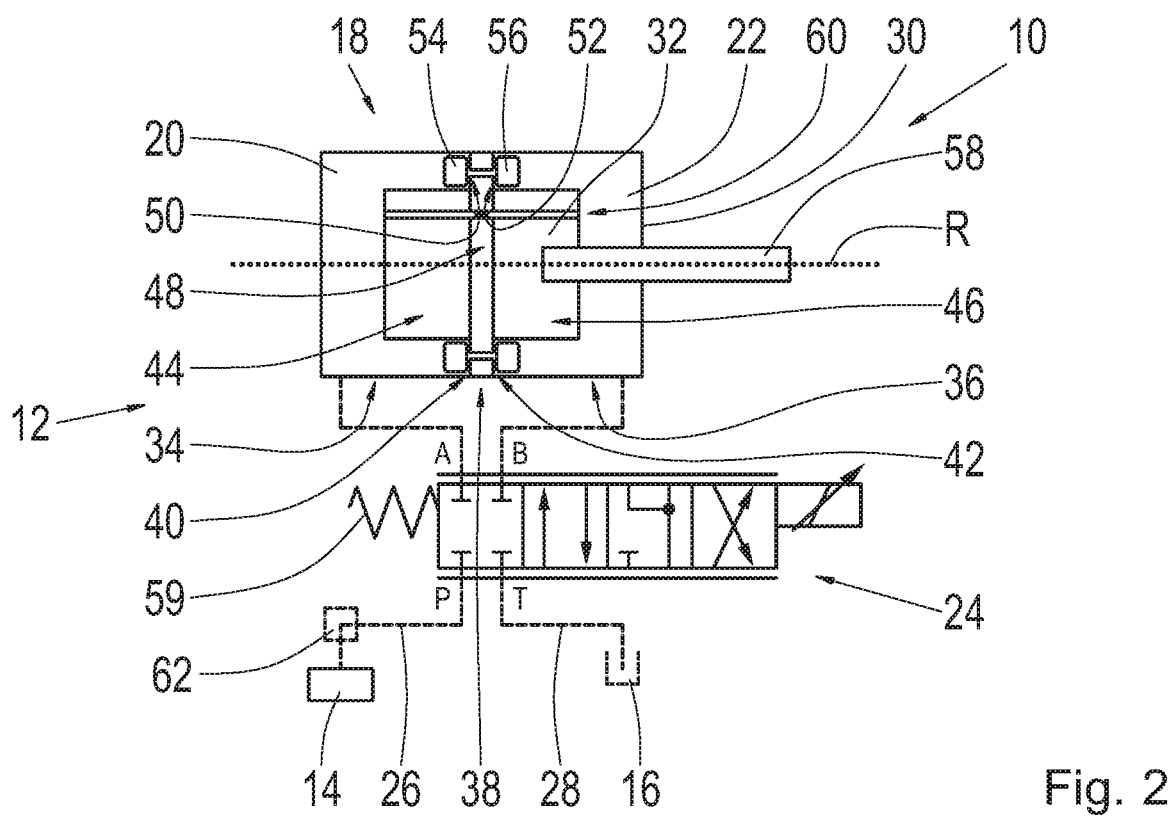
FIG. 2 schematically shows the motor vehicle transmission from FIG. 1 with an alternative variant of a of a hydraulic system.

FIGS. 1 and 2 each show a section from a motor vehicle transmission 10. The motor vehicle transmission 10 comprises a hydraulic system 12 and a pressure source 14 and a tank 16 for a hydraulic fluid.

The hydraulic system 12 has an actuator 18 with a first pressure chamber 20 and a second pressure chamber 22, which can have pressure applied to them for actuation of the actuator 18.

Further, the hydraulic system 12 comprises a valve 24 with at least four ports A, B, P, T. In the process, the first pressure chamber 20 is connected to the first port A, the second pressure chamber 22 is connected to the second port B, the pressure source 14 is connected via a pressure supply line 26 to the third port P and the tank 16 is connected via a tank line 28 to the fourth port T.

The actuator 18 has a cylinder 30, in whose interior the two pressure chambers 20, 22 are arranged. Further, the actuator 18 comprises an actuator piston 32 held in the cylinder 30, which divides the cylinder 30 into the first pressure chamber 20 and the second pressure chamber 22.

The cylinder 30 has a first section 34, a second section 36 and a third section 38, wherein the third section 38 is arranged between the first section 34 and the second section 36.

The inner cross-sectional area of the third section 38 is smaller than the respective inner cross-sectional area of the first section 24 and of the second section 36, so that a first step 40 is formed between the first section 34 and the third section 38 and a second step 42 is formed between the third section 38 and the second section 36.

The inner cross-sectional area of the first section 38 and of the second section 36 of the cylinder 30 are preferably the same size. However, they can also differ from each other.

Similarly, the actuator piston 32 has three segments 44, 46, 48, wherein the third section 48 is arranged between the first section 44 and the second section 46.

The cross-sectional area of the third section 48 is larger than the respective cross-sectional area of the first section 44 and of the second section 46, so that a third step 50 is formed between the first section 44 of the actuator piston 32 and the third section 48 of the actuator piston 32 and a fourth step 52 is formed between the third section 48 and the second section 46 of the actuator piston 32.

The cross-sectional area of the first section 48 and the second section 46 of the actuator piston 32 are preferably the same size. However, they can also differ from each other.

A first annular piston 54 is arranged around the first section 44 of the actuator piston 32. The first annular piston 54 fills an intermediate space between the first section 44 of the actuator piston 32 and the first section 34 of the cylinder 30 at least in sections and thus essentially prevents a fluid flow between the first pressure chamber 20 and the second pressure chamber 22.

Similarly, a second annular piston 56 is arranged around the second section 46 of the actuator piston 32, which fills an intermediate space between the second section 46 of the actuator piston 32 and the second section 36 of the cylinder 30 at least in sections and thus prevents a fluid flow between the first pressure chamber 20 and the second pressure chamber 22.

The first annular piston 54 and/or the second annular piston 56 is/are moveable towards the actuator piston 32. The first annular piston 54 and/or the second annular piston 56 can accordingly also be referred to as a floating piston.

A switch element 58 of the motor vehicle transmission 10 is arranged on the actuator piston 32. The switch element 58 is in particular a switching rod of the motor vehicle transmission 10, which is used for the actuation of a clutch device. The clutch device is for example configured as a dog clutch or as another type of clutch.

Subsequently the mechanics of the hydraulic system 12 will be described in greater detail on the basis of FIGS. 1 to 5.

For actuation of the switch element 58 the actuator piston 32 is moved along its axial direction R, by having a higher pressure applied to one of the two pressure chambers 20, 22. The actuator piston 32 is then shifted in the direction of the lower pressure.

Figure 3:
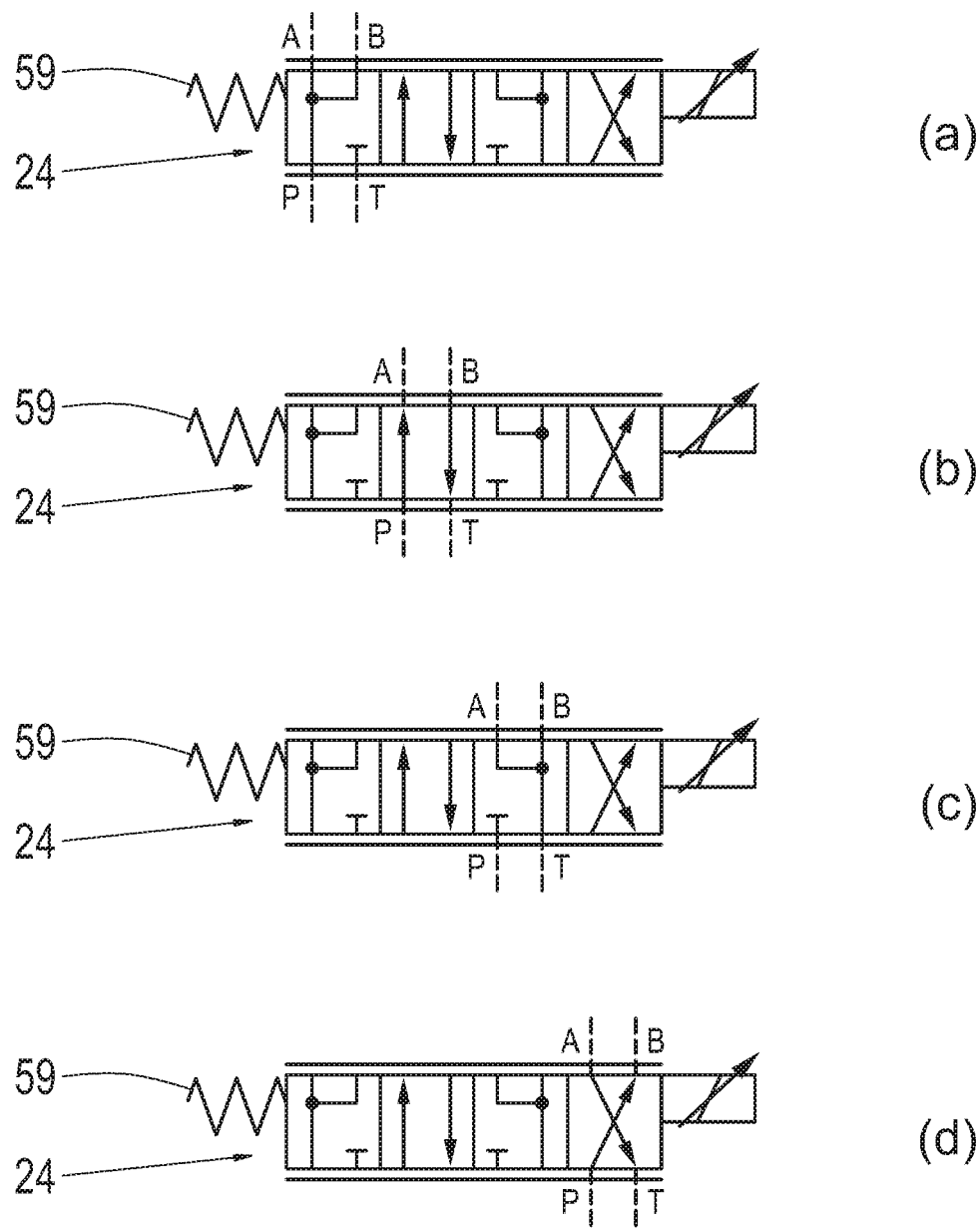
FIG. 3(a) to (d) show four different switching positions of a valve of the hydraulic system of FIG. 1.
Figure 4:
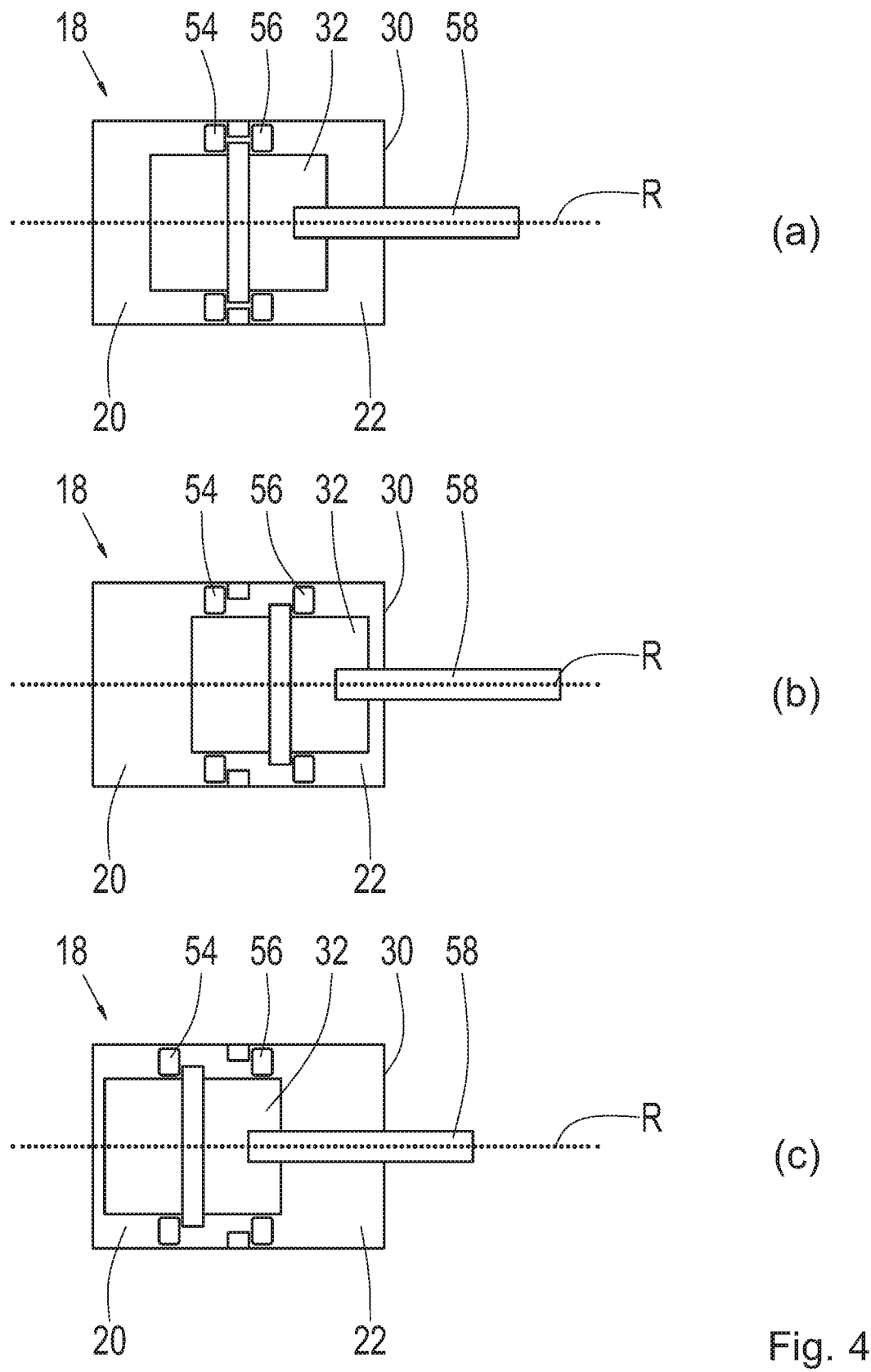
FIG. 4(a) to (c) show three different switching positions of an actuator of the hydraulic system of FIG. 1.
Figure 5:
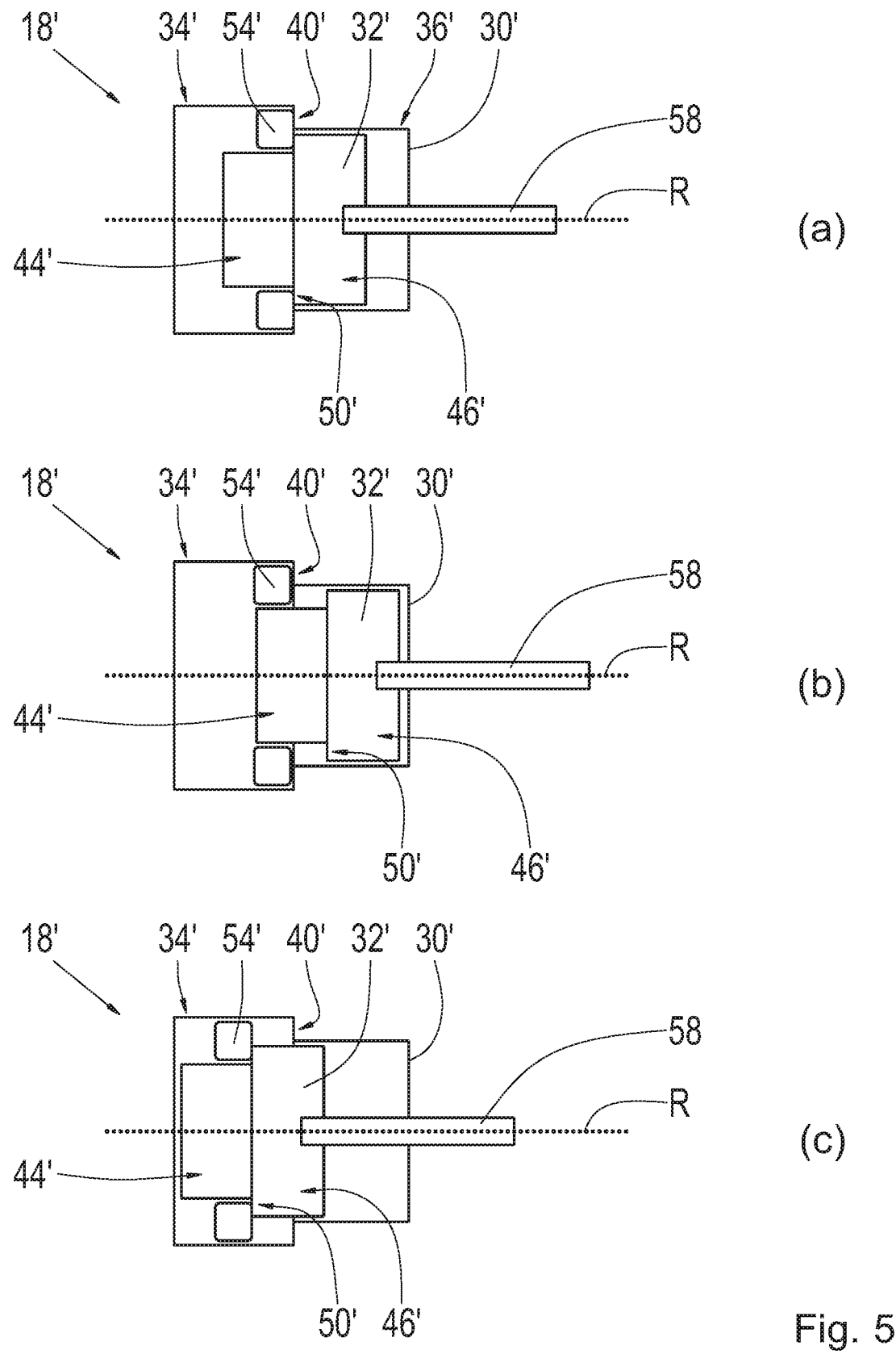
FIG. 5(a) to (c) show three different switching positions of an alternative variant of the actuator of a hydraulic system.

The valve 24 controls the actuator 18, said valve having to this end four different switching positions, which are indicated in FIGS. 1 to 3 schematically by the individual squares in the valve 24, wherein the arrows each denote a fluid flow direction. Accordingly, the valve 24 in the shown embodiment is a 4/4 way valve.

The valve 24 is transferred by a return device 59 back to the initial position. In particular the return device 59 is a spring. The valve 24 is thus then configured as a spring-loaded valve. If the valve 24 is unactuated, thus not impinged with an external force, it returns to the initial position due to the return device 59.

The valve 24 can also be an electromagnetically actuated or a pilot-controlled valve 24. Accordingly, the valve 24 is controlled by means of an electromagnet or by means of a hydraulic or pneumatic pressure.

Alternatively, the valve 24 can also be configured as a 5/4 way valve, wherein the additional port is then preferably assigned to the tank 16.

In each of the switching positions of the valve 24 the pressure chambers 20, 22 are in each case fluidically connected to the pressure source 14, fluidically connected to the tank 16 or fluidically blocked from the pressure source 14 and the tank 16. In an initial position of the valve 24, see FIGS. 1 to 3(a), there is a fluid connection between the two pressure chambers 20, 22. This fluid connection is realized differently in the two variants of the hydraulic system 12, which are shown in FIGS. 1 and 2.

According to the variant from FIG. 1, in the initial position of the valve 24 both the first pressure chamber 20 and also the second pressure chamber 22 are connected to the pressure source 14.

Accordingly, in the initial position of the valve 24 the pressure is the same in both pressure chambers 20, 22, which is why the actuator piston 32 remains in its neutral position.

According to the variant shown in FIG. 2, none of the four ports A, B, P, T of the valve 24 are connected to one another. The two pressure chambers 20, 22 are thus in each case blocked from the pressure source 14 and from the tank 16.

In order to nevertheless ensure the same pressure in both pressure chambers 20, 22, a bypass line 60 is provided, which in particular is configured as a borehole through the actuator piston 32.

Through the bypass line 60 a pressure decrease in one of the pressure chambers 20, 22 can be compensated, so that the actuator piston 32 also in this case remains in its neutral position.

The further explanations apply for both of the above described variants, since in particular the further switching positions of the valve 24 are identical in both variants.

In the neutral position of the actuator piston 32 the first annular piston 54 abuts the first step 40 on the cylinder 30 and the third step 50 on the actuator piston 32. Analogously, the second annular piston 56 abuts the second step 42 on the cylinder 30 and the fourth step 52 on the actuator piston 32. The first step 40 and the third step 50 thus form together a stop for the first annular piston 54, while the second step 42 and the fourth step 52 form a stop for the second annular piston 56.

In the case of the same pressure in the pressure chambers 20, 22 the actuator piston 32 is securely held in its neutral position, since in the case of a deflection of the actuator piston 32 from its neutral position a resetting force to the neutral position always occurs, as will be discussed in the following using the example of a deflection in axial direction R to the right.

If the actuator piston 32 deflects to the right (see e.g. FIGS. 4(b) and 5(b)), the fourth step 52 carries the second annular piston 56 with it. The combination of the second annular piston 56 and the second section 46 of the actuator piston 32 has a greater overall cross-sectional area than the first section 44 of the actuator piston 32, which is why in the case of equal pressure in the two pressure chambers 20, 22 a resetting force to the neutral position of the actuator piston 32 occurs.

In the second switching position of the valve 24, which is shown in FIG. 3(b), the first pressure chamber 20 is connected to the pressure source 14, while the second pressure chamber 22 is connected to the tank 16.

FIGS. 4(b) and 5(b) show a resulting movement of the actuator piston 32. A greater force acts on the actuator piston 32 on the side that is assigned to the first pressure chamber 20, than on the side that is assigned to the second pressure chamber 22, which is why the actuator piston 32 moves along its axial direction R to the right.

In the process, the movement of the first annular pistons 54 is limited by the first step 40 of the cylinder 30, which forms a stop for the first annular piston 54, while the second annular piston 56 is carried along from the fourth step 52.

In the third switching position of the valve 24, which is shown in figure (c), both pressure chambers 20, 22 are connected to the tank 16, so that the actuator piston 32 can move essentially freely.

In the fourth switching position of the valve 24, which is shown in FIG. 3(d), the first pressure chamber 20 is connected to the tank 16, while the second pressure chamber 22 is connected to the pressure source 14.

A resulting movement of the actuator piston 32 is shown in FIGS. 4(c) and 5(c). A lesser force acts on the actuator piston 32 on the side that is assigned to the first pressure chamber 20 than on the side that is assigned to the second pressure chamber 22, which is why the actuator piston 32 moves along its axial direction R to the left.

In a switching operation typically the initial position, the second switching position, the third switching position and the fourth switching position are run through one after the other, wherein after that a switch should be made directly from the fourth switching position to the initial switching position.

To this end a blocking device 62 can be provided which permits switching back from the fourth switching position to the initial position without a significant change of pressure in the pressure chambers 20, 22. Preferably the blocking device 62 is configured as a switchable shut-off valve, which is arranged for example in the pressure supply line 26. Accordingly, in a blocking position of the shut-off valve independent from the switching position of the valve pressure is prevented from being applied to one of the two pressure chambers 20, 22 via the pressure supply line 16. Accordingly, it is possible to change from the fourth switching position of the valve 24 to the initial position, without acting on the actuator piston 32 again in the second switching position of the actuator piston in the direction of the second pressure chamber 22.

FIGS. 5(a) to (c) show an alternative variant of an actuator 18', wherein the rest of the structure of the hydraulic system 12 can remain unchanged.

A cylinder 30' of the actuator 18' has only a first section 34' and a second section 36', wherein the second section 36' has a smaller inner cross-section, so that a first step 40' is formed.

Also the actuator piston 32' has only a first section 44' and a second section 46', wherein the second section 46' has a larger cross-section than the first section 44', so that a second step 50' is formed.

In this case the second section 46' of the actuator piston 32' on the outside is essentially complementary to an inside wall of the second section 36' of the cylinder 30'.

Further, a first annular piston 54' is provided on the first section 44' of the actuator piston 32', as also in the above described case.

Otherwise, the actuator 18' may function similar to the above described actuator 18.

REFERENCE LIST 10 motor vehicle transmission
12 hydraulic system
14 pressure source
16 tank
18 actuator
20 first pressure chamber
22 second pressure chamber
24 valve
26 pressure supply line
28 tank line
30 cylinder
32 actuator piston
34 first section of the cylinder
36 second section of the cylinder
38 third section of the cylinder
40 first step
42 second step
44 first section of the actuator piston
46 second section of the actuator piston
48 third section of the actuator piston 50 third step
52 fourth step
54 first annular piston
56 second annular piston
58 switch element
59 return device
60 bypass line
62 blocking device
A first port
B second port
P third port
T fourth port
R axial direction

I claim:

1. A hydraulic system for a motor vehicle transmission, the hydraulic system comprising:
   an actuator;
   a valve;
   a pressure supply line; and
   a tank line,
   wherein the actuator has a first pressure chamber and a second pressure chamber each for applying a pressure to move a shifting rod of the actuator,
   wherein the pressure supply line is connected to a supply port of the valve and the tank line is connected to a tank port of the valve,
   wherein the valve is switchable between a plurality of positions such that the first pressure chamber is selectively in fluid communication with the second pressure chamber based on the position of the valve,
   wherein the valve includes a return device configured to move the valve into a default position absent a control force on the valve,
   wherein when the valve is in the default position, the first pressure chamber is in fluid communication with the second pressure chamber, and
   wherein the first pressure chamber and the second pressure chamber are connected neither to the pressure supply line nor to the tank line when the valve is in the default position, and wherein the first pressure chamber and the second pressure chamber are fluidically connected to each other by a bypass line when the valve is in the default position.

2. The hydraulic system according to claim 1, wherein the valve forms a fluid connection extending at least through a portion of the valve to cause the first pressure chamber to be in fluid communication with the second pressure chamber when the valve is in the default position.

3. The hydraulic system according to claim 1,
   wherein the actuator has a cylinder and an actuator piston located at least partially inside the cylinder, and
   wherein the actuator piston divides the cylinder into the first pressure chamber and the second pressure chamber.

4. The hydraulic system of claim 3, wherein a switch element of the actuator is connected to the actuator piston.

5. The hydraulic system according to claim 3, wherein the actuator has an annular piston arranged around at least a portion of the actuator piston.

6. The hydraulic system of claim 5, wherein the first pressure chamber is sealed against the second pressure chamber.

7. The hydraulic system according to claim 5, wherein a stop is located in the cylinder, and wherein the annular piston abuts the stop when the valve is in a first position.

8. The hydraulic system according to claim 5, wherein the cylinder has at least a first section and a second section, wherein the first section forms the first pressure chamber and wherein the second section forms the second pressure chamber, wherein the actuator piston has at least a first section and a second section, wherein the first section of the actuator piston is assigned to the first pressure chamber, and wherein the second section of the actuator piston is assigned to the second pressure chamber.

9. The hydraulic system according to claim 8, wherein an inner cross-sectional area of the first section of the cylinder is greater than an inner cross-sectional area of the second section of the cylinder such that a step is formed.

10. The hydraulic system according to claim 8, wherein the cylinder has a third section located between the first section and the second section of the cylinder, and wherein an inner cross-sectional area of the third section is less than the inner cross-sectional area of the first section and/or of the second section of the cylinder.

11. The hydraulic system according to claim 8, wherein the actuator piston has a third section located between the first section and the second section of the actuator piston, and wherein an inner cross-sectional area of the third section is greater than the inner cross-sectional area of the first section and/or of the second section of the cylinder.

12. The hydraulic system according to claim 11, wherein the annular piston is a first annular piston and wherein a second annular piston is also included, wherein the first annular piston is arranged around the first section of the actuator piston, and wherein the second annular piston is arranged around the second section of the actuator piston.

13. The hydraulic system according to claim 1, wherein the bypass line is located within the actuator.

14. The hydraulic system according to claim 13, wherein the bypass line includes a borehole through the actuator piston.

15. The hydraulic system according to claim 1, wherein the first pressure chamber and the second pressure chamber are each connected via the pressure supply line when the valve is in a first position.

16. The hydraulic system according to claim 1, wherein the valve is a 4/4 way valve or a 5/4 way valve.

17. The hydraulic system according to claim 1, wherein in a first position of the valve the first pressure chamber is connected to the pressure supply line and the second pressure chamber is connected to the tank line.

18. The hydraulic system according to claim 17, wherein in a second position of the valve, the first pressure chamber and the second pressure chamber are each connected to the tank line; and
    in a third position of the valve, the first pressure chamber is connected to the tank line and the second pressure chamber is connected to the pressure supply line.

* * * * *